(12) United States Patent
Shiga

(10) Patent No.: US 8,161,844 B2
(45) Date of Patent: Apr. 24, 2012

(54) SLIDING DEVICE COMPOSED OF COMBINED STRUCTURE OF SCREW BOLT AND NUT

(75) Inventor: Naoto Shiga, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 633 days.

(21) Appl. No.: 12/361,598

(22) Filed: Jan. 29, 2009

(65) Prior Publication Data

US 2009/0205465 A1    Aug. 20, 2009

(30) Foreign Application Priority Data

Jan. 30, 2008 (JP) ................................ 2008-018427

(51) Int. Cl.
*F16H 35/00* (2006.01)

(52) U.S. Cl. ........................................................ 74/841

(58) Field of Classification Search ................. 74/89.23, 74/424.71, 841
See application file for complete search history.

(56) References Cited

U.S. PATENT DOCUMENTS

| 6,064,138 A  * | 5/2000 | Iino et al. ................. 310/316.01 |
| 6,940,209 B2 * | 9/2005 | Henderson ............... 310/323.02 |
| 2007/0071571 A1* | 3/2007 | Zakrzewski .................... 411/32 |

FOREIGN PATENT DOCUMENTS

| CN | 1136478 A  * | 11/1996 |
| WO | 2005027190 A2 | 3/2005 |

* cited by examiner

*Primary Examiner* — Vicky Johnson
(74) *Attorney, Agent, or Firm* — Rothwell, Figg, Ernst & Manbeck, P.C.

(57) ABSTRACT

An object of the present invention is to provide a sliding device that can surely reduce damage caused by mutual sliding behavior. To achieve the object, a sliding device in which a screw bolt having a male thread and a nut having a female thread hole in which a female thread is formed on an inner circumference are screwed together in a state capable of screw rotation and applied with repeating screw rotation so that the male thread and the female thread are subjected to a sliding load, wherein when Vickers hardness of a first metal material constituting the male thread of the screw bolt is $H_1$, and Vickers hardness of a second metal material constituting the female thread on the inner circumference of the female thread hole in the nut is $H_2$, $|H_1-H_2|=300$ HV0.1 to 350 HV0.1 is employed.

7 Claims, 4 Drawing Sheets

SLIDING DEVICE COMPOSED OF COMBINED STRUCTURE OF SCREW BOLT AND NUT

BACKGROUND OF THE INVENTION

1. Field of the Invention

The present invention relates to a sliding device composed of a combined structure of a screw bolt and a nut, particularly to an optimal combination of a screw bolt and a nut used as a component of an actuator.

2. Description of the Related Art

Recently, cellular phones including a down-sized camera and/or high functional cameras (increased pixels, auto-focusing (AF) function and the like) are popularly used, and a zooming mechanism is installed in a down-sized camera. In order to move a lens in the zooming mechanism, a method using a rapid deformation (impact driving) of a piezoelectric element is employed. Also, a unit using the piezoelectric element is mounted on a digital camera as a vibration compensation device (type of directly moving CCD) for anti-shake system. Reasons why the piezoelectric element is used is that when an electromagnetic motor is used, for example, an electromagnetic field generated in a cellular phone may cause an electromagnetic noise to make the size reduction hard and the assembly difficult. Also, as a method of moving a lens in an auto-focusing mechanism, combination of a stepping motor and a gear or combination of a voice coil motor and a spring have been popularly used, but there are plenty of objects to lessen volume required for a mechanism and/or a power consumption and the like.

As a method that can solve those problems, applying of an auto-focusing system using a piezo motor has been increased. The term "piezo" means "to apply pressure" in Greek. When a pressure is applied to a crystal, an electric charge is generated in proportion. When the phenomenon is used in reverse, a volume is contracted by applying a voltage to a piezo element. The phenomenon is applied to make use for positioning of the piezo motor. The piezo motor has a property that the element is contracted with applied voltage, and the property is used to cause a vibration and transmit the vibration to another element. The property is used with skill for an actuator which convert received vibration of the piezo element to a driving force in the auto-focusing mechanism using the piezo motor for continuous movement of a lens for focusing.

By using the piezo motor, positioning of lens movement can be made precisely and moreover, complicated mechanical components are not required any more to result improved reliability and silence since the lens is driven only by voltage control to the element. Also, when the piezo motor is used, durability can be easily improved, problems hardly occurs even after repeating motion for several million times and quick response and high energy efficiency can be achieved. Which is an excellent characteristic as compared with conventional motor driving. However, because of the quick response, fine adjustment is difficult. So, a system adopting a combined structure of a lead screw and a stator for a piezoelectric element and lens driving is employed in the auto-focusing mechanism. When the structure of the lead screw having a male thread combined with the stator in which a female thread is formed in a female thread hole on an inner circumference is applied, a feature that a rotating motion of a screw is converted to a linear motion is used to enable fine adjustment.

However, a problem in such a case is damage caused by slight relative reciprocal sliding motion, that is, fretting motion. The damage occurs locally at a contact portion of members in a mechanical component subjected to vibration, repeated stress, fluctuating stress and the like. In the combined structure of the lead screw and the stator, surface damage called fretting wear may easily occur when two faces are slightly slide while in contact. With progress of the fretting wear, reddish-brown fine oxidized abrasion powder called cocoa takes place in the air at a contact portion in a steel materials. Taking place of the oxidized abrasion powder may cause back-lash to reduce mechanical accuracy and functions extremely, also which causes vibration and/or noise. Moreover, adhesion of the abrasion powder might make disassembly and/or repair impossible.

As described above, the phenomenon caused by fretting wear is serious surface damage in the fields of tribology and material strength. When the repeating stress is put on the contact portion at the same time, fretting fatigue occurs, and fatigue cracks might be generated in a damaged portion, which progresses and results destruction of the member and extremely reduces fatigue strength of the member.

In order to solve such problems, in Japanese Patent Application (National Publication of International Patent Application No. 2007-505599), a device for driving a shaft assembly comprising a shaft with screw having a rotating shaft and a nut screwed therewith, wherein a) the assembly contains means for giving an ultrasonic vibration to the nut, by which the shaft with screw penetrating the nut is rotated and moved in the axial direction at the same time;

b) the shaft with screw is connected to a load that can move in the axial direction; and c) the assembly is further including means for giving an axial force to the shaft with screw is proposed. Also, in the embodiment, as a material for a shaft 12 with screw and a screwed nut 16, the combination employing stainless for the shaft 12 and brass for the nut 16 is preferred to minimize abrasion.

However, in Japanese Patent Application (National Publication of International Patent Application No. 2007-505599), as the materials of the shaft 12 with screw and the screwed nut 16 in the embodiment of the description, the shaft 12 with screw is made of substantially stainless steel, and a brass nut is used for the nut 16 to be engaged with the shaft, but with the combination of the shaft with screw and the screwed nut by the materials disclosed in Japanese Patent Application (National Publication of International Patent Application No. 2007-505599), it is actually difficult to obtain sufficient durability as a sliding device. Also, in the embodiment of the application, the thread shape of the shaft 12 with screw is preferably notched, and a pitch of the screw is preferably approximately 200 or less thread grooves per inch.

As mentioned above, those with more excellent durability have been required for a sliding device screwed capable of screw rotation and subjected to a sliding load during repeating screw rotation.

SUMMARY OF THE INVENTION

Figure 1:
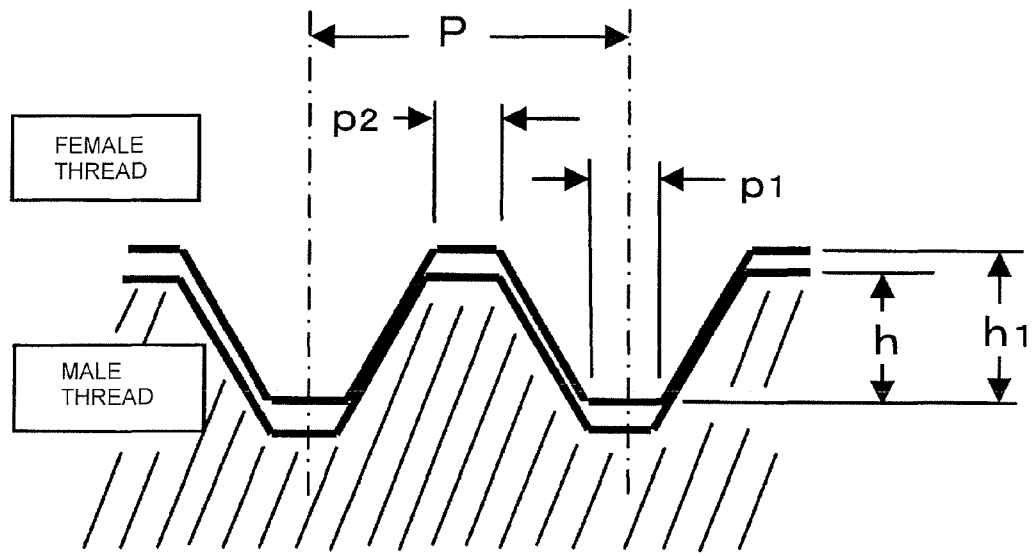
FIG. 1 is a shape of a thread portion formed on a screw bolt and a nut according to the present invention.

Then, the inventors screwed a screw bolt having a male thread into a nut having a female thread hole in which a female thread is formed on an inner circumference in a state capable of screw rotation, and conducted repeating screw rotation with attention paid to a difference in hardness on both sliding portions subjected to a sliding load and a shape of the thread. As a result, the inventors have found out conditions satisfying durability and accurate operation as a sliding device. The present invention will be described below.

A sliding device according to the present invention in which a screw bolt having a male thread and a nut having a female thread hole in which a female thread is formed on an inner circumference are screwed together in a state capable of screw rotation and is applied with repeating screw rotation so that the male thread and the female thread are subjected to a sliding load is characterized in that when Vickers hardness of a first metal material constituting the male thread of the screw bolt is $H_1$, and Vickers hardness of a second metal material constituting the female thread of the inner circumference of the female thread hole in the nut is $H_2$, $|H_1-H_2|$ is 300 HV0.1 to 350 HV0.1.

In the sliding device according to the present invention, it is preferable that Vickers hardness $H_1$ of the first metal material is in a range of 550 HV0.1 to 600 HV0.1.

In the sliding device according to the present invention, it is preferable that a martensite stainless steel with an alloy composition for the first metal material described below is used as the first metal material:

[Alloy Composition for First Metal Material]
  Nickel: 0.6 wt % or less
  Chromium: 12.0 to 18.0 wt %
  Carbon: 0.16 to 1.2 wt %
  Silicon: 1.0 wt % or less
  Manganese: 1.25 wt % or less
  Phosphorous: 0.06 wt % or less
  Sulfur: 0.15 wt % or less
  Control: iron and unavoidable impurities In the sliding device according to the present invention, it is preferable that Vickers hardness $H_2$ of the second metal material is in a range of 220 HV0.1 to 240 HV0.1.

In addition, in the sliding device according to the present invention, it is preferable that an austenite stainless steel with an alloy composition for the second metal material described below is used as the second metal material:

[Alloy Composition for Second Metal Material]
  Nickel: 7.0 to 13.0 wt %
  Chromium: 17.0 to 20.0 wt %
  Carbon: 0.15 wt % or less
  Silicon: 1.0 wt % or less
  Manganese: 2.5 wt % or less
  Phosphorous: 0.2 wt % or less
  Sulfur: 0.15 wt % or less
  Control: iron and unavoidable impurities In the thread formed in the screw bolt and the nut according to the present invention, it is preferable that a nominal diameter M is 1.1 mm or less, a pitch P is 0.2 mm or less, a radial length at a screwed portion is 0.05 mm or more, a width of a thread peak portion is 0.015 to 0.05 mm, a width of a thread groove portion of the screw bolt is 0.04 mm or less, and a width of a thread groove portion of the nut is 0.03 mm or less.

As for a tolerance of the threads formed on the screw bolt and the nut, it is preferable that an effective diameter tolerance zone grade of the screw bolt is 3 G and the effective diameter tolerance zone grade of the nut is 4 G.

In a piezo motor using the sliding device according to the present invention as a constituent member for sliding and moving a driven matter which comprises a lead screw, a stator screwed with the lead screw, and at least two piezo elements provided on an outer circumference portion of the stator, and the at least two pieces of the piezo elements are arranged on the outer circumference portion of the stator and contained in a piezo-motor holding member, it is preferable that they use the nut constituting the sliding device as the stator and the screw bolt as the lead screw.

It is preferable that the piezo motor according to the present invention is used as an actuator for driving lens in a camera.

In the sliding device of the present invention, abrasion damage in a sliding behavior on both the male thread and the female thread is reduced by effectively reducing abrasion on both the male thread and the female thread to the minimum by managing $|H_1-H_2|$ between 300 HV0.1 to 350 HV0.1, when Vickers hardness of a metal material constituting the male thread is $H_1$, and Vickers hardness of a metal material constituting the female thread is $H_2$. As a result, longer life and durability as the sliding device can be improved drastically.

Also, when the threads formed on the screw bolt and the nut to be the sliding device of the present invention is set at the nominal diameter M of 1.1 mm or less, the pitch P of 0.2 mm or less, the radial length of the screwed portion of 0.05 mm or more, the width of the thread peak portion of 0.015 mm to 0.05 mm, the width of the thread groove portion of the screw bolt is 0.04 mm or less, and the width of the thread groove portion of the nut of 0.03 mm or less, performance of the screw rotation can be smooth and accurate.

By using the sliding device of the present invention, the above-mentioned excellent property can be performed in lens driving to result supply of a high-quality camera.

DETAILED DESCRIPTION OF THE PREFERRED EMBODIMENTS

An embodiment of the sliding device according to the present invention will be described below. To prevent confusion, a material constituting the thread of the screw bolt is referred to as a first metal material and a material constituting the thread of the nut is referred to as a second metal material in the following description.

In the sliding device according to the present invention in which the screw bolt having the male thread and the nut having the female thread hole in which a female thread is formed on an inner circumference are screwed together in a state capable of screw rotation and a sliding load is subjected to a male thread and a female thread when repeating screw rotation is carried out, it is preferable to satisfy $|H_1-H_2|=300$ HV0.1 to 350 HV0.1, when Vickers hardness of the first metal material constituting the male thread of the screw bolt is $H_1$, and Vickers hardness of the second metal material constituting the female thread of the inner circumference of the female thread hole in the nut is $H_2$. In addition, it is preferable that the material to be the screw bolt has hardness higher than that of the material to be the nut. When a hardness difference between the bolt and the nut is within this range, friction damage on both the nut inner circumferential face and a sliding face of the screw bolt can be reduced, a stable sliding behavior can be performed, and favorable durability can be obtained. When the hardness difference between the bolt and the nut is less than 300 HV0.1, solid lubrication effect is reduced to make a surface of the softer material hard and brittle by friction, and it may cause a problem of chipping on the hardened portion surface and reduce durability. On the other hand, when the hardness difference between the bolt and the nut exceeds 350 HV0.1, an abrasion on the side of a material with lower hardness may increase, and durability of a structure is reduced. The difference between the Vickers hardness $H_1$ and the Vickers hardness $H_2$ is just required to satisfy the above range at least for the hardness difference between the thread surfaces (portion to be a sliding face) of the screw bolt and the nut.

In the sliding device according to the present invention, it is preferred that Vickers hardness $H_1$ of the first metal material is in a range of 550 HV0.1 to 600 HV0.1. When the Vickers hardness $H_1$ is less than 550 HV0.1, abrasion by friction between an outer circumferential face (sliding face) of the screw bolt and an inner circumferential face (sliding face) of the nut at driving becomes remarkable, and it is difficult to prolong the life as a structure. On the other hand, when Vickers hardness $H_1$ exceeds 600 HV0.1, the surface on the sliding face on the first metal material becomes too hard and brittle and results lack of durability. Therefore, when the first metal material manufactured from martensite stainless steel with the hardness in the above range is used in combination with the second metal material, the abrasion resistance on the sliding faces on the both sliding devices is drastically improved. Vickers hardness $H_1$ is just required to satisfy the above range on at least the hardness of the thread surface (portion to be the sliding face).

An alloy composition for the first metal material used in the present invention is classified to a martensite stainless steel consists of nickel, chromium, carbon, silicon, manganese, phosphorus, sulfur, and iron and unavoidable impurities for control, and a nickel content of 0.6 wt % or less, chromium content of 12.0 wt % to 18.0 wt %, carbon content of 0.16 wt % to 1.2 wt %, silicon content of 1.0 wt % or less, manganese content of 1.25 wt % or less, phosphorus content of 0.06 wt % or less, sulfur content of 0.15 wt % or less and iron and unavoidable impurities for control. That is, materials included in this range are those equivalent to SUS420 grade and/or SUS440 grade.

Each component of the alloy composition for the first metal material according to the present invention will be described below.

The nickel content is preferably 0.6 wt % or less. Nickel is an austenite forming element and contributes to improvement in corrosion resistance and toughness. However, when nickel content exceeds 0.6 wt %, hardness at annealing increases and workability in cold rolling may be reduced. Also, when crystalline structure is transformed to martensite, increased remaining austenite amount may result drop of hardness after tempering.

The chromium content is preferably 12.0 wt % to 18.0 wt %. Chromium is an element necessary for improvement in corrosion resistance of the stainless steel. However, since chromium is a ferrite forming element, when it is excessively contained, a remaining austenite amount is increased and strength and toughness may be reduced. Thus, when the chromium content is less than 12.0 wt %, sufficient corrosion resistance can not be obtained. In contrast, when the chromium content exceeds 18.0 wt % may result drop of hardness after tempering.

The carbon content is preferably 0.16 wt % to 1.2 wt %. Carbon is an element necessary to ensure strength of the stainless steel and to make the stainless steel martensite. However, when carbon is excessively added, not only that generation of coarse primary carbides reduces workability in cold rolling after annealing process and corrosion resistance and toughness after quenching-tempering but also that the remaining austenite amount is increased and hardness after tempering is reduced. Thus, when the carbon content is less than 0.16 wt %, sufficient hardness can not be obtained. In contrast, when the carbon content exceeds 1.2 wt %, sufficient corrosion resistance and toughness can not be obtained.

The silicon content is preferably 1.0 wt % or less. Silicon is effective as a deoxidizer. On the other hand, since silicon hardens stainless steel, when the silicon content is too high, toughness and workability of the stainless steel may be reduced. Also, since silicon is a ferrite forming element, transformation of the stainless steel to be martensite may be prevented. Thus, when the silicon content exceeds 1.0 wt %, sufficient strength, toughness and workability can not be obtained.

The manganese content is preferably 1.25 wt % or less. Manganese is also effective as a deoxidizing and/or desulfurizing element. Moreover, manganese is an austenite forming element and when it is added excessively, a remaining austenite amount is increased, and not only hardness after tempering is reduced but also corrosion resistance is reduced. Thus, when the manganese content exceeds 1.25 wt %, sufficient strength and corrosion resistance can not be obtained.

The phosphorus content is preferably 0.06 wt % or less. Phosphorus is an element that reduces workability in hot rolling, grain boundary strength and toughness, so it is preferable to minimize. Thus, when the phosphorus content exceeds 0.06 wt %, sufficient toughness cannot be obtained.

The sulfur content is preferably 0.15 wt % or less. Sulfur is an element that reduces corrosion resistance and toughness at cold rolling and also reduces workability in hot rolling, so it is preferable to minimize. Thus, when the sulfur content exceeds 0.15 wt %, sufficient toughness and favorable working performance can not be obtained.

Next, it is preferable that the Vickers hardness $H_2$ of the second metal material is in a range of 220 HV0.1 to 240 HV0.1. When the Vickers hardness $H_2$ is less than 220 HV0.1, abrasion caused by friction between the outer circumferential face (sliding face) of the screw bolt and the inner circumferential face (sliding face) of the nut at driving becomes remarkable to result difficulty in making the life as a structure long. On the other hand, when the Vickers hardness $H_2$ exceeds 240 HV0.1, the surface of the sliding face on the second metal material becomes too hard and brittle to result difficulty in making durability long. Therefore, when the first metal material manufactured by a martensite stainless steel with the hardness in the above range is used in combination with the second metal material, the abrasion resistance on the sliding face on both of the sliding devices is drastically improved. The Vickers hardness $H_2$ is just required to satisfy on at least the hardness on the surface of the thread (a portion to be the sliding face).

The alloy composition of the second metal material used in the present invention is nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less, and iron and unavoidable impurities for control. That is, materials included in this range are those equivalent to SUS303 grade and/or SUS304 grade.

Each component of the alloy composition for the second metal material according to the present invention will be described below.

The nickel content is preferably 7.0 wt % to 13.0 wt %. Nickel is an austenite forming element as a basic element of an austenite stainless steel. Nickel contributes to improvement of corrosion resistance of the stainless steel when being added in a preferred amount. However, in the case of the nickel content less than 7.0 wt % in the austenite stainless steel, sufficient toughness and abrasion resistance can not be obtained. In contrast, when the nickel content exceeds 13.0 wt %, improvement of corrosion resistance cannot be achieved any more and is not economical.

The chromium content is preferably 17.0 wt % to 20.0 wt %. Chromium is an element necessary in the stainless steel. The corrosion resistance of the stainless steel is remarkably improved to be a chromium alloy. The effect is enhanced with increase in the chromium content. When the chromium content is less than 17.0 wt %, the corrosion resistance is not improved. In contrast, when the chromium content exceeds 20.0 wt %, two-phase structure of a ferrite and an austenite is formed to make favorable plastic workability specific to an austenite deteriorate, so it is not preferable.

The carbon content is preferably 0.15 wt % or less. Carbon is effective in stabilizing an austenite structure and increasing strength at high-temperature, but at a high temperature of approximately 600 deg.-C., chromium carbide is formed to reduce corrosion resistance of the crystal grain boundary. When the carbon content exceeds 0.15 wt %, strength is reduced, so it is not preferable.

The silicon content is preferably 1.0 wt % or less. Silicon is effective in improvement of oxidation resistance and salt corrosion resistance at high-temperature. However, when the silicon content exceeds 1.0 wt %, further effect can not be obtained, so it is not economical.

The manganese content is preferably 2.5 wt % or less. Manganese is a necessary element as a deoxidizing agent. However, when the manganese content exceeds 2.5 wt %, effect obtained may be saturated, so it is not economical.

The phosphorus content is preferably 0.2 wt % or less. Phosphorus is an element that reduces workability in hot rolling, grain boundary strength and toughness, so it is preferable to minimize. Thus, when the phosphorus content exceeds 0.2 wt %, sufficient toughness can not be obtained.

The sulfur content is preferably 0.15 wt % or less. Sulfur is an element that reduces corrosion resistance and toughness at cold rolling and also reduces workability in hot rolling, so it is preferable to minimize. Thus, when the sulfur content exceeds 0.15 wt %, sufficient toughness can not be obtained.

Figure 2:
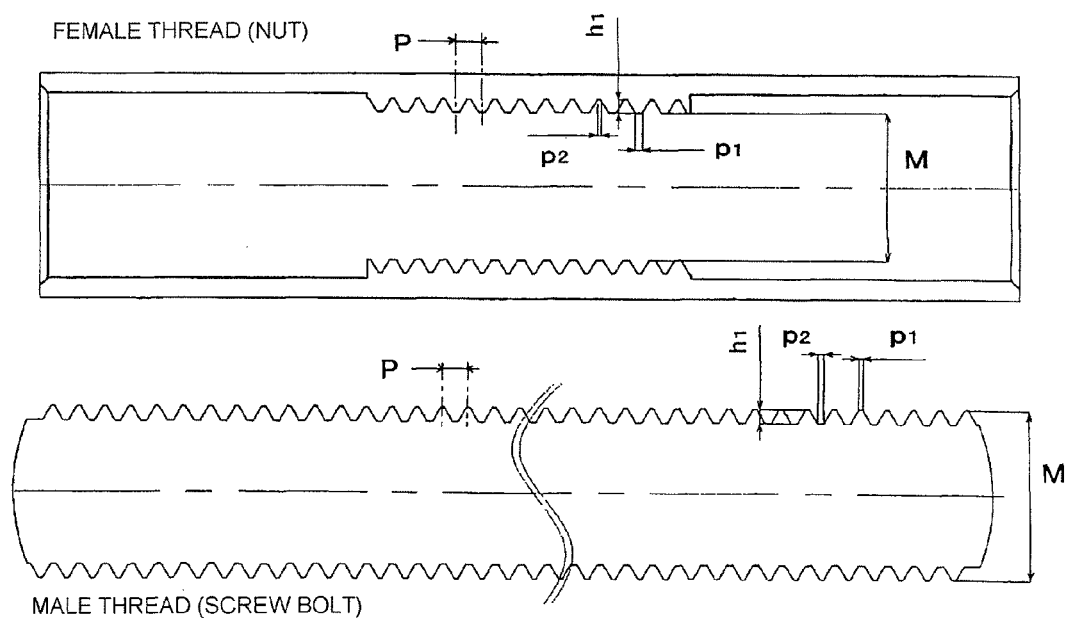
FIG. 2 is a shape of a screw formed on the screw bolt and the nut according to the present invention.

Details of the specifications of the thread shapes formed on the screw bolt and the nut in the present invention are illustrated in FIGS. 1 and 2. As shown in FIGS. 1 and 2, a screw is constituted by a male thread and a female thread, and the screw can play its role by combining the both. A pitch P refers to a distance between the adjacent threads, a height of a screwed portion h refers to a radial length of a portion where the treads are in contact when seen perpendicularly to the center axis of the shaft, M refers to a nominal diameter, which are a radial diameter of the male thread peak and a radial diameter of the female thread groove, $p_1$ refers to a width of a thread peak portion, $p_2$ refers to a width of bottom of a thread groove portion in the axial direction, and $H_1$ refers to a size obtained by measuring a distance between the peak and bottom of the groove of a thread when seen perpendicularly to the center axis of the shaft.

In the shapes of a threads in the screw bolt (male thread) and the nut (female thread) shown in FIGS. 1 and 2, it is preferable that the nominal diameter M is 1.1 mm or less, pitch P is 0.2 mm or less, a height of a screwed portion h is 0.05 mm or more, width $p_1$ of a thread peak portion is 0.015 mm to 0.05 mm, width $p_2$ of bottom of a thread groove portion of the screw bolt is 0.04 mm or less, and width $p_2$ of bottom of the thread groove portion of the nut is 0.03 mm or less. When the size of the thread formed on the screw bolt and the nut satisfies the above-mentioned conditions, a sliding load on both of the male thread and the female thread is reduced, and durability can be improved, even at repeating screw rotation. In order to improve durability of the screw bolt and the nut, a certain gap is required between the male thread and the female thread, but when the gap is too large, the screw bolt may not work with accuracy. On the other hand, when the gap is too small, a frictional force generated on the screw face is increased and durability is reduced.

As for tolerance of the thread size in the screw bolt and the nut of the present invention, preferable effective diameter tolerance zone grade are 3 G for the screw bolt and 4 G for the nut (JIS B 0209-1). Here, the effective diameter refers to a diameter of a virtual cylinder where the diameters in the axial direction of the thread peak portion of the male thread and the thread groove portion of the female thread is the same. The grade of the both male thread and the female thread popularly used is 6 G. The tolerance 4 G of the female thread is 40 μm and the tolerance 3 G of the male thread is 24 μm in the present invention is considerably strict when compared to the tolerance of 48 μm of the male thread with 6 G. However, by combining the screw bolt and the nut manufactured with the tolerance, a sliding device with good durability and stable quality can be obtained.

In a piezo motor using the sliding device according to the present invention as a constituent member for sliding and moving a driven matter which comprises a lead screw, a stator screwed with the lead screw, and at least two piezo elements provided on an outer circumference portion of the stator, and the at least two pieces of the piezo elements are arranged on the outer circumference portion of the stator and contained in a piezo-motor holding member, it is preferable that they use the nut constituting the sliding device as the stator and the screw bolt as the lead screw. In such arrangement, as the piezo motor holding g of the present invention holds only node portions of the two piezo motors, the piezo motor holding member sandwiches the two piezo elements. Thus, the piezo motor holding member of the present invention can stably fix the two piezo elements as compared with a case the two piezo elements are fixed on one side.

It is preferable that the piezo motor according to the present invention is used as an actuator for driving lens in a camera. By employing the actuator as an actuator for lens driving, a light-weight and high-performance camera can be supplied.

Figure 3:
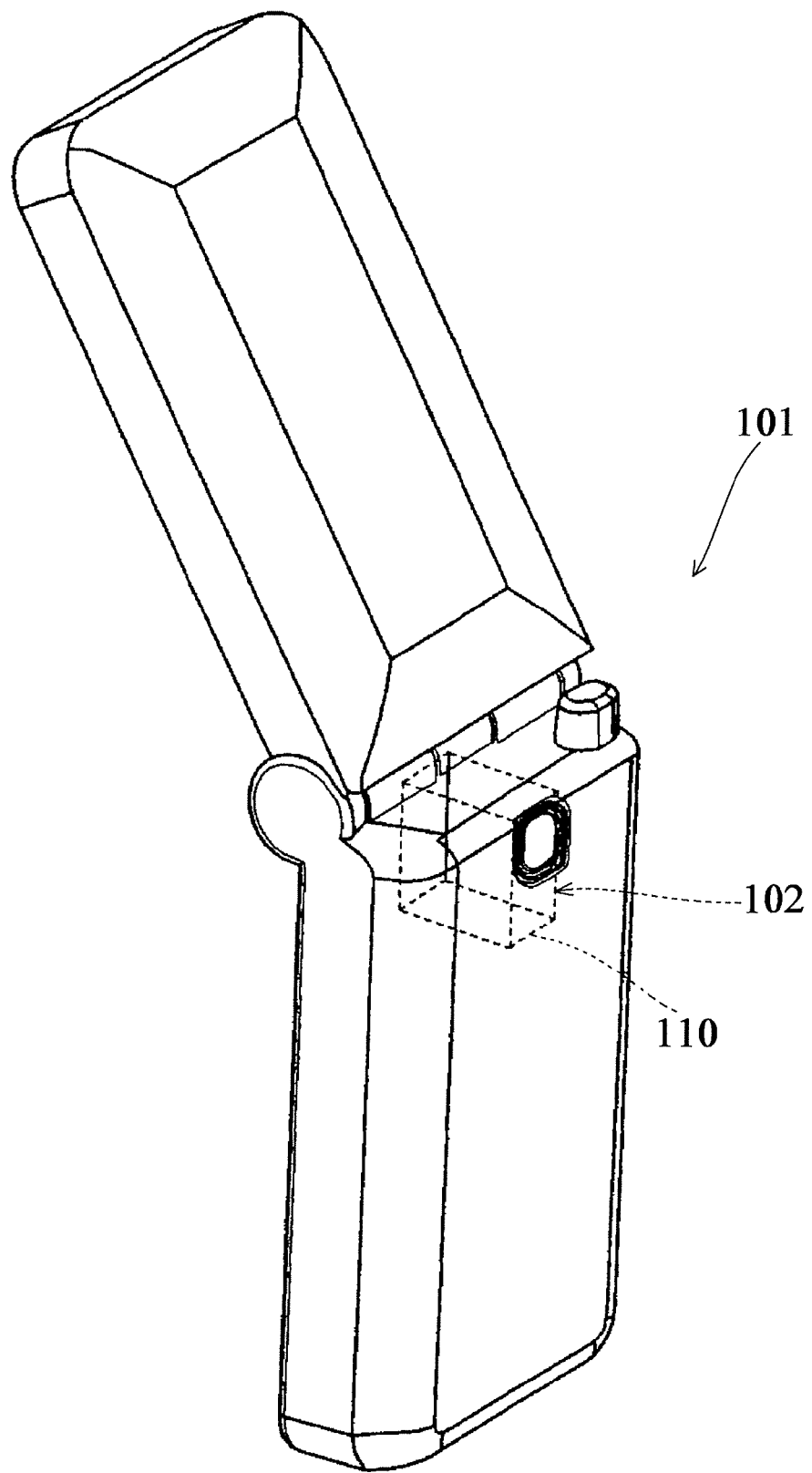
FIG. 3 is an appearance diagram of a cellular phone illustrating one embodiment of the present invention.
Figure 4:
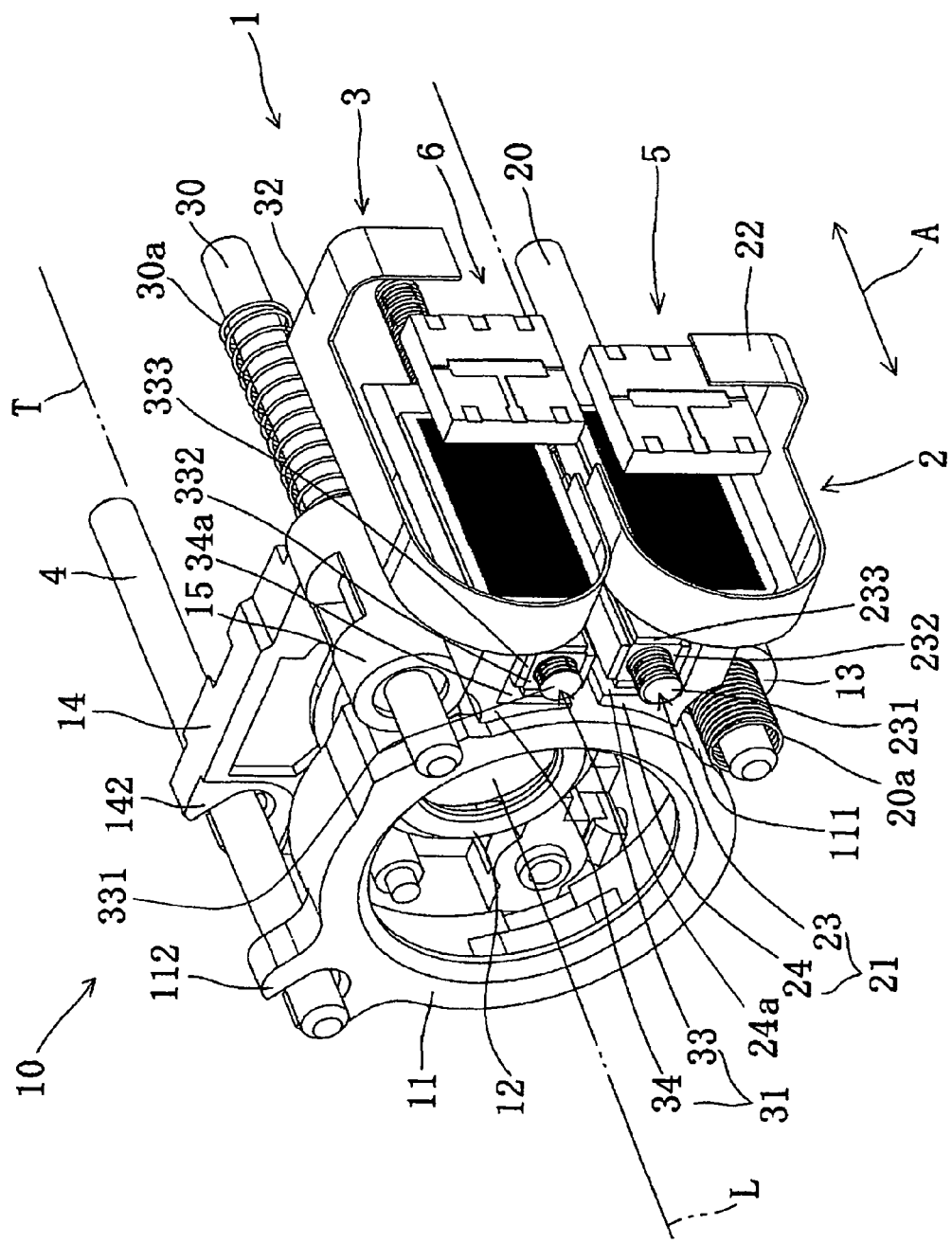
FIG. 4 is a perspective view of a lens unit illustrating an embodiment of the present invention.
Figure 5:
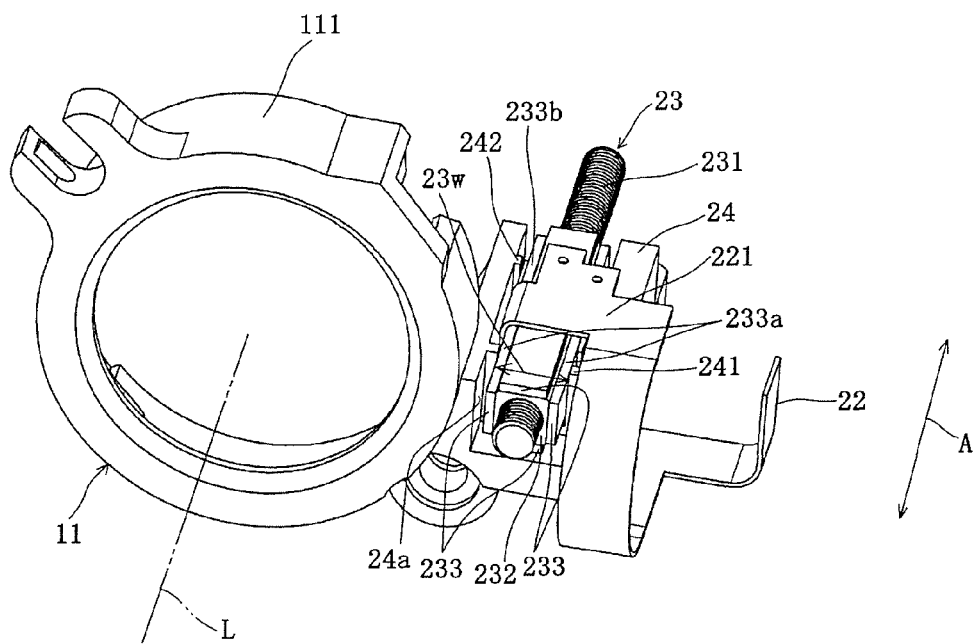
FIG. 5 is a perspective view of an essential part around a first piezo motor holding member in FIG. 4.

Here, an example of the camera using the sliding device of the present invention as a piezo motor (actuator for lens driving) is shown in FIGS. 3 to 5. An embodiment using the sliding device of the present invention will be described below in detail using the figures.

FIG. 3 is an schematic view of a cellular phone 101 showing one embodiment of the present invention. The cellular phone 101 is a cellular phone including a camera function and contains a camera module 102. The camera module 102 is including a case 110 formed in a box shape, a lens unit disposed in the case 110, and a charge coupled device (CCD). And the camera module 102 is constructed to form an image of a reflected light of a object on the charge coupled device and convert the image to an electric signal and then output the electric signal to an A/D converter and the like according to an operation of a user.

FIG. 4 is a perspective view of a lens unit 10. The lens unit 10 contains a first lens group holding frame 11, a second lens group holding frame 12, and a lens driving device 1. The first lens group holding frame 11 and the second lens group holding frame 12 are arranged in series along an optical axis L.

And the first lens group holding frame 11 is arranged on the front side (object side). The first lens group holding frame 11 is arranged so that a first lens group (not shown) is held inside. On an outer circumference portion 111 of the first lens group holding frame 11, a first guide member 13 is connected. The first guide member 13 is formed cylindrically and arranged in parallel with the optical axis L. Also, at the first lens group holding frame 11, a support portion 112 for a first rotation prevention shaft is provided. The support portion 112 for a first rotation prevention shaft is formed in the U-shape seen from the object side (also from the focus side).

On the other hand, the second lens group holding frame 12 is arranged on the rear side (focus side). The second lens group holding frame 12 is constructed to hold a second lens group (not shown) inside. Also, on the rear side (focus side) of the second lens group holding frame 12, a supporting member 14 is connected. The supporting member 14 is a member for supporting the second lens group holding frame 12 so that the second lens group holding frame 12 is arranged in series with the first lens group holding frame 11. Also, at the supporting member 14, a second guide member 15 is connected. The second guide member 15 has cylindrical shape and arranged in parallel with the optical axis L. Also, at the supporting member 14, a second rotation prevention shaft support portion 142 is provided. The second rotation prevention shaft support portion 142 has a U-shape seen from the object side (also from the focus side).

And the lens driving device 1 independently drives the first lens group holding frame 11 and the second lens group holding frame 12, respectively. The lens driving device 1 is arranged on the right side of an outer circumference region of a moving orbit T of the lens group holding frame. The moving orbit T is a cylindrical orbit on which the first lens group holding frame 11 and the second lens group holding frame 12 move along the optical axis L.

And the lens driving device 1 contains a first lens group holding frame driving device 2, a second lens group holding frame driving device 3, a rotation prevention shaft 4, a first lens group holding frame moving distance measuring device 5, and a second lens group holding frame moving distance measuring device 6.

The rotation prevention shaft 4 is a member for preventing rotation of the both lens group holding frames 11 and 12 when the both lens group holding frames 11 and 12 are sliding and moving in an optical axis direction A. The rotation prevention shaft 4 is supported by the rotation prevention shaft support portions 112 and 142 of both the lens group holding frames 11 and 12. Also, the first lens group holding frame moving distance measuring device 5 is a device for measuring a distance moved of the first lens group holding frame 11. The second lens group holding frame moving distance measuring device 6 is a device for measuring a distance moved of the second lens group holding frame 12.

And the first lens group holding frame driving device 2 is a device for driving the first lens group holding frame 11. The first lens group holding frame driving device 2 is provided with, as shown in FIG. 4, a first guide pole 20, a first driving means 21, and a first flexible printed wiring board 22. The first guide pole 20 is a member for movably supporting the first lens group holding frame 11 in the optical axis direction A. The first guide pole 20 is formed in an elongated round bar shape. And the first guide pole 20 is inserted through the first guide member 13 and arranged in parallel with the optical axis L. Also, in the first guide pole 20, a spring 20a is inserted on the object side rather than the first guide member 13. The spring 20a is arranged to urge the first lens group holding frame 11 to the focus side all the time.

On the other hand, the first driving means 21 contains a first piezo motor 23 and a first piezo motor holding member 24. The first piezo motor 23 contains a lead screw 231, a nut 232, and four piezo elements 233. The lead screw 231 is arranged in parallel with the optical axis L. The nut 232 is screwed with the lead screw 231. The four piezo elements 233 are provided on top, bottom, right and left of an outer circumference portion of the nut 232. Here, a case where the screw bolt to be a male thread in FIG. 2 is used as the lead screw 231 and a female thread in FIG. 2 is used as the nut 232 is illustrated as an example.

Also, the first flexible printed wiring board 22 supplies driving power and a control signal to the first piezo motor 23. In the first flexible printed wiring board 22, as shown in FIG. 5, a terminal portion 221 on one end side is connected to the first piezo motor 23 and the other end side is connected to a power supply and a control unit (not shown).

Figure 6:
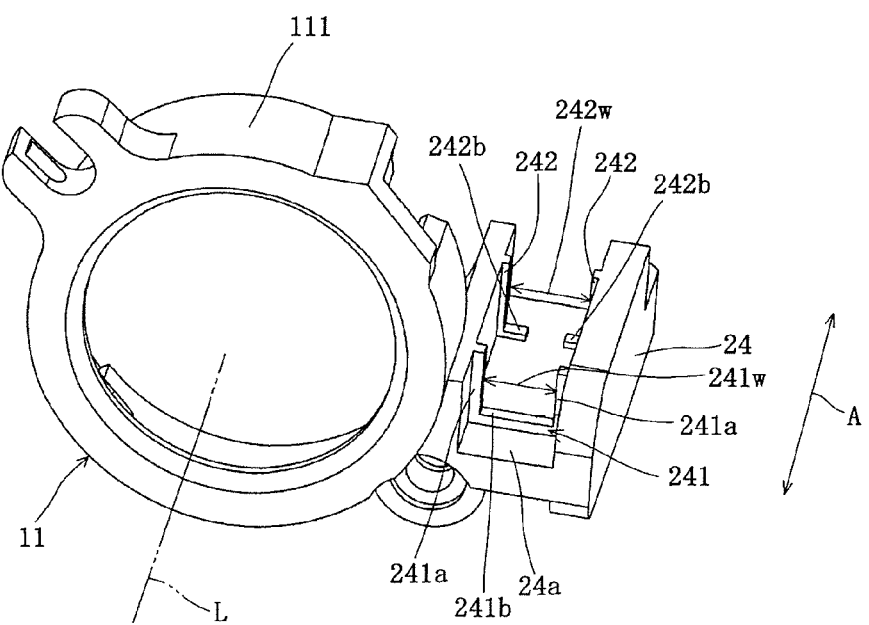
FIG. 6 is a perspective view excluding the first piezo motor and a first flexible printed wiring board from FIG. 5.

Also, the first piezo motor holding member 24 is a member for moving the first lens group holding frame 11 using a driving force which is output of the first piezo motor 23. The first piezo motor holding member 24 is connected to the outer circumference portion 111 of the first lens group holding frame 11. And the first piezo motor holding member 24 is formed long in the optical axis direction A. Moreover, the first piezo motor holding member 24 is constructed to contain the first piezo motor 23 connected to the first flexible printed wiring board 22. Also, the first piezo motor holding member 24 is constructed so as to surround three piezo elements 233 (the piezo elements 233 on right, left and bottom side in FIG. 5) of the first piezo motor 23. Specifically as shown in FIG. 6, the first piezo motor holding member 24 is formed substantially in a recess shape when seen from the object side (also from the focus side). And in FIG. 6, on an inner wall 24a of the first piezo motor holding member 24, a first projection 241 and a pair of second projections 242 and 242 on right and left are formed. The projections 241, 242 and 242 are arranged side by side in the front and rear portion (optical axis direction A) of the first piezo motor holding member 24.

The first projection 241 is formed on the object side of the inner wall 24a. Moreover, the first projection 241 is, as shown in FIG. 5, formed so that only a vibration node portion 233a of the three piezo elements 233 on the object side is held while the first piezo motor 23 is contained within the first piezo motor holding member 24. In FIG. 5, each vibration node portion 233a of the piezo element 233 on the right and left sides are shown.

The first projection 241 will be specifically described. As shown in FIG. 6, the first projection 241 is formed substantially in the recess shape when seen from the object side (also from the focus side). Moreover, the first projection 241 has a width 241w between the right and left side portions 241a and 241a set slightly smaller than a lateral width 23w of the first piezo motor 23 (See FIG. 5). Moreover, the first piezo motor holding member 24 is constituted by an elastic material. Therefore, it is arranged such that when the first piezo motor 23 is inserted between the first projections 241, the right and left side portions 241a, 241a of the first projection 241 press the object sides of right and left opposing two piezo elements 233 and 233 into contact and sandwich them using the elastic force. Also, the object side of the bottom piezo element 233 is brought into contact with a bottom portion 241b of the first projection 241. The bottom portion 241b determines an installation position of the first piezo motor 23.

On the other hand, as shown in FIG. 6, the both second projections 242 and 242 are formed on the focus side of the inner wall 24a. Moreover as shown in FIG. 3, the both second projections 242 and 242 are formed so that only the vibration node portion 233b on the focus side of the three piezo elements 233 is held while the first piezo motor 23 is contained within the first piezo motor holding member 24. FIG. 5 shows the node portion 233b of the left piezo element 233.

Specifically, the second projection 242 on the left side is arranged at a position in contact with the node portion 233b of the left side piezo element 233 and the left side portion of the node portion of the bottom piezo element 233. And as shown in FIG. 6, the second projection 242 on the left side is formed substantially in the L shape when seen from the object side (also from the focus side). Also, the second projection 242 on the right side is arranged at a position in contact with the node portion of the right piezo element 233 and the right side portion of the node portion of the bottom piezo element 233. And the second projection 242 on the right side is formed substantially in the inverted L shape symmetrically with the second projection 242 on the left side when seen from the object side (also from the focus side).

And a width 242w between the both second projections 242 and 242 is set slightly smaller than the lateral width 23w of the first piezo motor 23 (See FIG. 5). Therefore, it is arranged such that when the first piezo motor 23 is inserted between the second projections 242 and 242, the both second projections 242 and 242 press the focus sides of the right and left opposing two piezo elements 233 and 233 into contact and sandwich them using the elastic force. Also, the focus side of the bottom piezo element 233 is brought into contact with a bottom portions 242b of the both second projections 242. The bottom portions 242b determines an installation position of the first piezo motor 23.

And in the first piezo motor 23, only each node portion 233a of the three piezo elements 233 are held by the projections 241, 242 and 242. Moreover, only each node portion 233a of two piezo elements 233 opposing in the right and left are pressed into contact with the projections 241, 242, 242 and sandwiched by them. Thereby, the first piezo motor 23 is fixed to the first piezo motor holding member 24 only with the node portions 233a.

Next, a driving method of the first lens group holding frame 11 by the first lens group holding frame driving device 2 will be described. First, driving power and a control signal are supplied from a power supply and a control unit through the first flexible printed wiring board 22 to each piezo element 233. Thereby, each piezo element 233 is vibrated, and the lead screw 231 is rotated in a forward/backward direction. The rotation of the lead screw 231 makes the nut 232 move on the lead screw 231. The movement of the nut makes the first piezo motor holding member 24 move in the optical axis direction A, and makes the first lens group holding frame 11 slid and move in the optical axis direction A along the first guide pole 20 also.

On the other hand, as shown in FIG. 4, the second lens group holding frame driving device 3 is a device for driving the second lens group holding frame 12. The second lens group holding frame driving device 3 contains a second guide pole 30, a second driving means 31, and a second flexible printed wiring board 32. The second guide pole 30 is a member for movably supporting the second lens group holding frame 12 in the optical axis direction A. The second guide pole 30 is formed in an elongated round bar shape. And the second guide pole 30 is inserted into the second guide member 15 and arranged in parallel with the optical axis L. Also, in the second guide pole 30, a spring 30a is inserted on the focus side rather than the second guide member 15. The spring 30a is arranged to urge the second lens group holding frame 12 to the object side all the time.

On the other hand, the second driving means 31 contains a second piezo motor 33 and a second piezo motor holding member 34. The second piezo motor 33 contains a lead screw 331, a nut 332, and four piezo elements 333. The lead screw 331 is arranged in parallel with the optical axis L. The nut 332 is screwed with the lead screw 331. The four piezo elements 333 are provided on top, bottom, right and left of an outer circumference portion of the nut 332.

Also, the second flexible printed wiring board 32 supplies a control signal and a driving power to the second piezo motor 33. A terminal portion on one edge of the second flexible printed wiring board 32 is connected to the second piezo motor 33 and the other edge is connected to a power supply and a control unit (not shown). The second piezo motor holding member 34 is a member for moving the second lens group holding frame 12 using a driving force which is output of the second piezo motor 33. The second piezo motor holding member 34 is connected to the second lens group holding frame 12 through the second guide member 15.

And the second piezo motor holding member 34 is formed longer in the optical axis direction A. Moreover, the second piezo motor holding member 34 is constructed such that the second piezo motor 33 is contained in a state connected to the second flexible printed wiring board 32. Also, the second piezo motor holding member 34 is constructed so as to surround the three piezo elements 333 (piezo elements 333 on right, left and upper side) of the second piezo motor 33. Specifically, the second piezo motor holding member 34 is formed substantially in the inverted recess shape in vertical symmetry with the first piezo motor holding member 24 when seen from the object side (also from the focus side). And on an inner wall 34a of the second piezo motor holding member 34, a projection is formed. The projection is, though not shown, the same as the projections 241, 242 and 242 formed in the first piezo motor holding member 24 (See FIG. 6).

That is, the projection formed in the second piezo motor holding member 34 holds only the vibration node portions of the three piezo elements 333 in the second piezo motor 33. Moreover, the projection presses into contact and sandwiches only the vibration node portions of the right and left opposing two piezo elements 333. Here, the node portions are the same as the node portions 233a and 233b of the first piezo motor 23. Since only node portions of the three piezo elements 333 are held by the projection, the second piezo motor 33 is fixed to the second piezo motor holding member 34 only by these node portions.

Next, a driving method of the second lens group holding frame 12 by the second lens group holding frame driving device 3 will be described. Driving power and a control signal are supplied from a power supply and a control unit through the second flexible printed wiring board 32 to each piezo element 333. Thereby, each piezo element 333 is vibrated, and the lead screw 331 is rotated in a forward/backward direction. The rotation of the lead screw 331 makes the nut 332 move on the lead screw 331. The movement of the nut makes the second piezo motor holding member 34 move in the optical axis direction A, and makes the second lens group holding frame 11 slid and move in the optical axis direction A along the second guide pole also.

In such arrangement, in the piezo motor holding members 24 and 34 in the present embodiment, only each vibration node portion of the three piezo elements 233, 333 are held by the projection. Thereby, the opposing two piezo elements 233 and 233, 333 and 333 are sandwiched. Thus, the piezo motor holding members 24 and 34 in the present embodiment can fix the two piezo elements 233 and 233, 333 and 333 more stably than the case of fixing on one side. Therefore, the piezo motor holding members 24 and 34 of the present embodiment can improve fixing properties with respect to the piezo motors 23 and 33 without reduction of performance of the piezo motors 23 and 33.

Moreover, in the piezo motor holding members 24 and 34 of the present invention, only each vibration node portion of the opposing two piezo elements 233 and 233, 333 and 333 are pressed into contact and sandwiched by the projection. Thereby, an adhesive is not required for the piezo motor holding members 24 and 34 of the present embodiment when the piezo motors 23 and 33 are mounted.

Therefore, in the piezo motor holding members 24 and 34 of the present embodiment, since time for applying an adhesive or time for curing the adhesive is not required as conventional method, the work time for mounting the piezo motors 23 and 33 can be reduced. Thus, the piezo motor holding members 24 and 34 of the present embodiment can improve the workability of mounting the piezo motors 23 and 33 without reduction of the performance of the piezo motors 23 and 33 (driving capability of the lens group holding frames 11 and 12).

In the present embodiment, the present invention was applied to the piezo motors 23 and 33 including four piezo elements 233, 333. However, the present invention is not limited to the piezo motors 23 and 33 described in the present embodiment. That is, the present invention may be applied to the piezo motor in general in which two piezo elements are provided on an outer circumference portion of the nut. Also, the shape of the piezo motor holding member is only required to have the construction which at least enables to contain the piezo motor inside.

In addition to the description of the present embodiment, both of the projection and the adhesive may be used to hold only each vibration node portion of the two piezo elements in the piezo motor holding member of the present invention. The piezo motor holding member in this case can fix the piezo motor more stably, and the fixing properties with respect to the piezo motor can be further improved without reduction of the performance of the piezo motor.

Also, in the present embodiment, the present invention was applied to the holding members 24 and 34 driving the lens group holding frames 11 and 12 for a camera. However, the applications of the present invention should not be limited to the lens group holding frames 11 and 12. That is, the present invention may be applied to any member for sliding and moving a matter to be driven using a piezo motor.

The sliding device according to the present invention can achieve longer life and durability as a sliding device using a combination of the screw bolt and the nut under the above-mentioned conditions. As a result, a high quality sliding device can be provided. An example of the present invention will be described below citing data shown in Table 1.

EXAMPLES

Preparation of the screw bolt specimen: In Example shown in Table 1, a material of a martensite stainless steel which has a composition of nickel content of 0.6 wt % or less, chromium content of 12.0 wt % to 18.0 wt %, carbon content of 0.16 wt % to 1.2 wt %, silicon content of 0.15 wt % or less, manganese content of 1.25 wt % or less, phosphorus content of 0.06 wt % or less, sulfur content of 0.15 wt % or less and the control of iron and unavoidable impurities was used in preparation of the screw bolt.

Preparation of the nut specimen: In the Example shown in Table 1, a material of an austenite stainless steel which has a composition of a nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less and the control of iron and unavoidable impurities was used in preparation of the nut.

The martensite stainless steel for the screw bolt as the lead screw and the austenite stainless steel for the nut as the stator were used for a durability test. In the durability test, the nut as the stator is fixed and the screw bolt as the lead screw was slide forward and backward repeatedly in a predetermined range. In the test, when the thread was abraded and went out from the predetermined range, it was counted as an error, and when the behavior in sliding became unstable and errors occurred continuously, the test was finished and cycle of slide toward and backward of that time was made a durability cycle of the specimens. All the shapes of the threads in this test in the screw bolt specimen and the nut specimen were finished to be same with the conditions of the present invention.

The result of the durability test for three times on a combination of the members having the materials of Example was, the durability cycle was 300 thousand or more in single tests, and the average number of errors was 105 times.

Comparative Examples of the present invention will be described below citing data shown in Table 1.

Comparative Examples

Comparative Example 1

Preparation of the screw bolt specimen: In Comparative Example 1 shown in Table 1, a material of an austenite stainless steel which has a composition of a nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less and the control of iron and unavoidable impurities was used in preparation of the screw bolt.

Preparation of the nut specimen: In Comparative Example 1 shown in Table 1, a material of an austenite stainless steel which has the same composition with that of the above-mentioned screw bolt was used in preparation of the nut.

The result of the durability test for three times with the combination of the members having the materials in Comparative Example 1 was, the durability cycle was in a range of 50 thousand to 100 thousand cycles in single tests and the average number of errors was 1590 times.

Comparative Example 2

Preparation of the screw bolt specimen: In Comparative Example 2 shown in Table 1, a material of an austenite stainless steel which has a composition of a nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less and the control of iron and unavoidable impurities was used in preparation of the screw bolt.

Preparation of the nut specimen: In Comparative Example 2 shown in Table 1, a material of a ferrite stainless steel which has a composition of a chromium content of 11.5 wt % to 18.0 wt %, carbon content of 0.12 wt % or less, silicon content of 1.00 wt % or less, manganese content of 1.25 wt % or less, phosphorus content of 0.06 wt % or less, sulfur content of 0.15 wt % or less and the control of iron and unavoidable impurities was used in preparation of the nut.

The result of the durability test for three times with the combination of the members having the materials in Comparative Example 2 was, the durability cycle was 30 thousand cycles or less in single tests and the average number of errors was 10375 times.

Comparative Example 3

Preparation of the screw bolt specimen: In Comparative Example 3 shown in Table 1, a material of a martensite stainless steel which has a composition of a nickel content of 0.6 wt % or less, chromium content of 12.0 wt % to 18.0 wt %, carbon content of 0.16 wt % to 1.2 wt %, silicon content of 0.15 wt % or less, manganese content of 1.25 wt % or less, phosphorus content of 0.06 wt % or less, sulfur content of 0.15 wt % or less and the control of iron and unavoidable impurities was used in preparation of the screw bolt.

Preparation of the nut specimen: In Comparative Example 3 shown in Table 1, a material of a ferrite stainless steel which has a composition of a chromium content of 11.5 wt % to 18.0 wt %, carbon content of 0.12 wt % or less, silicon content of 1.00 wt % or less, manganese content of 1.25 wt % or less, phosphorus content of 0.06 wt % or less, sulfur content of 0.15 wt % or less and the control of iron and unavoidable impurities was used in preparation of the nut.

The result of the durability test for three times with the combination of the members having the materials in Comparative Example 3 was, the durability cycle was 50 thousand cycles or less in single tests and the average number of errors was 5800 times.

Comparative Example 4

Preparation of the screw bolt specimen: In Comparative Example 4 shown in Table 1, a material in which a sliding face of a copper alloy is plated with nickel alloy was used in preparation of the screw bolt.

Preparation of the nut specimen: In Example 4 shown in Table 1, a material of an austenite stainless steel which has a composition of a nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less and the control of iron and unavoidable impurities was used in preparation of the nut.

The result of the durability test for three times with the combination of the members having the materials in Comparative Example 4 was, the durability cycle was 50 thousand cycles or less in single tests and the average number of errors was 1902 times.

Comparative Example 5

Preparation of the screw bolt specimen: In Comparative Example 5 shown in Table 1, a material in which a sliding face of a copper alloy is plated with nickel alloy was used in preparation of the screw bolt.

Preparation of the nut specimen: In Comparative Example 5 shown in Table 1, a material of a ferrite stainless steel which has a composition of a chromium content of 11.5 wt % to 18.0 wt %, carbon content of 0.12 wt % or less, silicon content of 1.00 wt % or less, manganese content of 1.25 wt % or less, phosphorus content of 0.06 wt % or less, sulfur content of 0.15 wt % or less and the control of iron and unavoidable impurities was used in preparation of the nut.

The result of the durability test for three times with the combination of the members having the materials in Comparative Example 5 was, the durability cycle was 50 thousand cycles or less in single tests and the average number of errors was 8443 times.

Comparative Example 6

Preparation of the screw bolt specimen: In Comparative Example 6 shown in Table 1, a material of an austenite stainless steel which has a composition of a nickel content of 7.0 wt % to 13.0 wt %, chromium content of 17.0 wt % to 20.0 wt %, carbon content of 0.15 wt % or less, silicon content of 1.0 wt % or less, manganese content of 2.5 wt % or less, phosphorus content of 0.2 wt % or less, sulfur content of 0.15 wt % or less and the control of iron and unavoidable impurities was used in preparation of the screw bolt.

Preparation of the nut specimen: In Comparative Example 6 shown in Table 1, a material of a brass which has a composition of a copper content of 60 to 70 wt %, lead content of 0.10 wt % or less, iron content of 0.07 wt % or less and the control of zinc and unavoidable impurities was used in preparation of the nut.

The result of the durability test for three times with the combination of the members having the materials in Comparative Example 6 was, the durability cycle was 50 thousand cycles or less in single tests and the average number of errors was 10000 times or more.

Comparative Example 7

Preparation of the screw bolt specimen: In Comparative Example 7 shown in Table 1, a material of a martensite stainless steel which has a composition of a nickel content of 0.6 wt % or less, chromium content of 12.0 wt % to 18.0 wt %, carbon content of 0.16 wt % to 1.2 wt %, silicon content of 0.15 wt % or less, manganese content of 1.25 wt % or less, phosphorus content of 0.06 wt % or less, sulfur content of 0.15 wt % or less and the control of iron and unavoidable impurities was used in preparation of the screw bolt.

Preparation of the nut specimen: In Comparative Example 7 shown in Table 1, a material of a brass which has a composition of a copper content of 60 to 70 wt %, lead content of 0.10 wt % or less, iron content of 0.07 wt % or less and the control of zinc and unavoidable impurities was used in preparation of the nut.

The result of the durability test for three times with the combination of the members having the materials in Comparative Example 7 was, the durability cycle was 50 thousand cycles or less in single tests and the average number of errors was 10000 times or more.

Comparison Between Example and Comparative Examples

Example and Comparative Examples will be compared below referring Table 1. In Table 1, the nut specimen is a stator and the screw bolt specimen is a lead screw, and materials and hardness of the samples used were shown, respectively. In addition, relationship between a hardness difference of the female thread (nut) from the male thread (screw bolt) and a durability was investigated. Here, the judge "excellent" refers to a state where a stable sliding behavior passes 300 thousand sliding cycles or more, and state of the sliding behavior can be also determined from the number of errors.

Here, as the number of errors, the number of times when a point where a forward way is turned to a backward way was out of the predetermined range were counted when the screw bolt was sliding in the predetermined range. The evaluation "fair" refers to a state where a stable sliding behavior does not pass thousand sliding cycles but it passes 50 thousand cycles or more. The evaluation "poor" refers to a state where a stable sliding behavior does not pass 50 thousand sliding cycles.

material of the thread portion of the nut in Example, while a ferrite stainless steel is used in Comparative Example 2. The result also make it obvious that when the hardness of the thread portion in the screw bolt to be the lead screw is higher than that in the nut to be the stator, the durability and accuracy are improved. The reason why Comparative Example 2 is inferior is that since the hardness of the thread portions in both the screw bolt and the nut used in Comparative Example 2 is

TABLE 1

| Sample | Nut Specimen | | Screw Bolt Specimen | | Hardness difference (HV0.1) [$H_1 - H_2$] | Durability (cycle) | Average Number of errors (times) | Judge |
|---|---|---|---|---|---|---|---|---|
| | Material | Hardness (HV0.1) [$H_2$] | Material | Hardness (HV0.1) [$H_1$] | | | | |
| Example | Austenite stainless | 230 | Martensite stainless | 570 | 340 | 300 thousand or more | 105 | Excellent |
| Comparative Example 1 | Austenite stainless | 230 | Austenite stainless | 230 | 0 | 50 thousand to 100 thousand | 1590 | Fair |
| Comparative Example 2 | Ferrite stainless | 200 | Austenite stainless | 230 | 30 | 30 thousand or less | 10375 | Poor |
| Comparative Example 3 | Ferrite stainless | 200 | Martensite stainless | 570 | 370 | 50 thousand or less | 5800 | Poor |
| Comparative Example 4 | Austenite stainless | 230 | Copper alloy + nickel alloy plating | 160 | −70 | 50 thousand or less | 1902 | Poor |
| Comparative Example 5 | Ferrite stainless | 200 | Copper alloy + nickel alloy plating | 160 | −40 | 50 thousand or less | 8443 | Poor |
| Comparative Example 6 | Copper alloy (brass) | 100 | Austenite stainless | 230 | 130 | 50 thousand or less | 10000 or more | Poor |
| Comparative Example 7 | Copper alloy (brass) | 100 | Martensite stainless | 570 | 470 | 50 thousand or less | 10000 or more | Poor |

Comparison between Example and Comparative Example 1: When the combination of the composition for the screw bolt and the nut in Example was employed, the number of durability shows 300 thousand cycles or more and the average number of errors was 105 times. It is an extremely excellent durability performance. In contrast, the result of Comparative Example 1 is poorer than Example, the number of durability was 50 thousand to 100 thousand cycles and the average number of errors was 1590 times. The difference between the both is the material of the thread portion in the screw bolt. A martensite stainless steel is used in Example, while an austenite stainless steel is used in Comparative Example 1. From the result, it can be understood that when the hardness of the thread portion in the screw bolt to be the lead screw is higher than that in the nut to be the stator, both the durability and the position accuracy are improved. The reason why Comparative Example 1 is inferior is that since the hardness of the thread portion in the screw bolt used in Comparative Example 1 is lower than the preferable range of the present invention, the sliding face of the screw bolt is easily damaged by abrasion in the sliding performance.

Comparison between Example and Comparative Example 2: Example and Comparative Example 2 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 2 is extremely poorer than Example, the number of durability was 30 thousand cycles or less and the average number of errors was 10375 times. The difference between the both is the material of the thread portion in the screw bolt. A martensite stainless steel is used in Example, while an austenite stainless steel is used in Comparative Example 2. And an austenite stainless steel is used for the material of the thread portion of the nut in Example, while a ferrite stainless steel is used in Comparative Example 2. The result also make it obvious that when the hardness of the thread portion in the screw bolt to be the lead screw is higher than that in the nut to be the stator, the durability and accuracy are improved. The reason why Comparative Example 2 is inferior is that since the hardness of the thread portions in both the screw bolt and the nut used in Comparative Example 2 is lower than the preferable range of the present invention, the sliding faces of the both are damaged easily by abrasion in the sliding performance.

Comparison between Example and Comparative Example 3: Example and Comparative Example 3 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 3 is poorer than Example, the number of durability was 50 thousand cycles or less and the average number of errors was 5800 times. The difference between the both is the material of the thread portion in the nut. An austenite stainless steel is used in Example, while a ferrite stainless steel is used in Comparative Example 3. The result also make it obvious that when the hardness of the thread portion in the screw bolt to be the lead screw is higher than that in the nut to be the stator, the durability and accuracy are improved. The reason why Comparative Example 3 is inferior is that since the hardness of the thread portion in the nut used in Comparative Example 3 is lower than the preferable range of the present invention and the hardness difference between the both exceeds the preferable range of the present invention, the sliding face of the nut is easily damaged by abrasion in the sliding performance.

Comparison between Example and Comparative Example 4: Example and Comparative Example 4 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 4 is poorer than Example, the number of durability was 50 thousand cycles or less and the average number of errors was 1902 times. The difference between the both is the material of the thread portion in the screw bolt. A martensite stainless steel is used in Example, while a copper alloy with its surface nickel alloy plated is used in Comparative Example 4. The result also make it obvious that when the hardness of the thread portion in the screw bolt to be the lead screw is higher than that in the nut to be the stator, the durability and accuracy are improved. The reason why Comparative Example 4 is inferior is that since the hardness of the thread portion in the screw bolt used in Comparative Example 4 is lower than the preferable range of the present invention and is lower than the hardness of the nut, the sliding face of the screw bolt is easily damaged by abrasion in the sliding performance.

Comparison between Example and Comparative Example 5: Example and Comparative Example 5 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 5 is poorer than Example, the number of durability was 50 thousand cycles or less and the average number of errors was 8443 times. The difference between the both is the material of the thread portion in the screw bolt. A martensite stainless steel is used in Example, while a copper alloy with its surface nickel alloy plated is used in Comparative Example 5. And an austenite stainless steel is used for the material of the thread portion of the nut in Example, while a ferrite stainless steel is used in Comparative Example 5. The result also make it obvious that when the hardness of the thread portion in the screw bolt to be the lead screw is higher than that in the nut to be the stator, the durability and accuracy are improved. The reason why Comparative Example 5 is inferior is that since the hardness of the thread portion in the screw bolt used in Comparative Example 5 is lower than the preferable range of the present invention and lower than the hardness of the nut, the sliding face of the screw bolt is easily damaged by abrasion in the sliding performance.

Comparison between Example and Comparative Example 6: Example and Comparative Example 6 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 6 is extremely poorer than Example, the number of durability was 50 thousand cycles or less and the average number of errors was 10000 times. The difference between the both is the material of the thread portion in the screw bolt. A martensite stainless steel is used in Example, while an austenite stainless steel is used in Comparative Example 6. And an austenite stainless steel is used for the material of the thread portion of the nut in Example, while a copper alloy (brass) is used in Comparative Example 6. The result also make it obvious that when the hardness of the thread portion in the screw bolt to be the lead screw is higher than that in the nut to be the stator, the durability and accuracy are improved. The reason why Comparative Example 6 is inferior is that since the hardness of the thread portions in both the screw bolt and the nut used in Comparative Example 6 is lower than the preferable range of the present invention, the sliding face of the both are easily damaged by abrasion in the sliding performance.

Comparison between Example and Comparative Example 7: Example and Comparative Example 7 will be compared referring Table 1. When the combination of the composition for the screw bolt and the nut in Example was employed, the number of durability shows 300 thousand cycles or more and the average number of errors was 105 times. It is an extremely excellent durability performance. In contrast, the result of Comparative Example 7 is extremely poorer than Example, the number of durability was 50 thousand cycles or less and the average number of errors was 10000 times. The difference between the both is that even a martensite stainless steel is commonly used for the material of the thread portion in the screw bolt in both Example and Comparative Example 7, but a copper alloy (brass) is used in Comparative Example 7 for the material of the thread portion of the nut, while an austenite stainless steel is used in Example. The result also make it obvious that when the hardness of the thread portion in the screw bolt to be the lead screw is higher than that in the nut to be the stator, the durability and accuracy are improved. The reason why Comparative Example 7 is inferior is that since the hardness of the thread portions in both the screw bolt and the nut in Comparative Example 7 is lower than the preferable range of the present invention, the sliding faces of the both are easily damaged by abrasion in the sliding performance.

Summary of comparison between Example and Comparative Examples: From the comparisons between Example and Comparative Examples described above, to surely reduce damage caused by sliding behavior such as mutual abrasion, frictional damage and the like in the sliding device in which the screw bolt having the male thread and the nut having the female thread hole in which a female thread is formed on an inner circumference are screwed together in a state capable of screw rotation and applied with repeating screw rotation so that the male thread and the female thread are subjected to a sliding load, it can be understood that the hardness difference between the thread portions of the both and the material of the thread portions should be considered.

The sliding device according to the present invention constituted by the screw bolt having the male thread and the nut having the female thread hole in which a female thread is formed on an inner circumference can reduce the abrasion on the sliding faces in both of the screw bolt and the nut to the minimum and effectively reduce mutual frictional damage involved in the sliding behavior by setting a condition of a hardness difference between the both thread portions, materials of the thread portions, and the shapes of the thread portions. As a result, the accurate and smooth motion can be assured for a long time by using the sliding device of the present invention. Then longer life and durability of a product provided with it can be drastically improved and can be widely utilized for controllers and the like which comprises a feeding mechanism using a screw.

What is claimed is:

1. A camera using a piezo motor for sliding a driven matter as an actuator for driving a lens,
    wherein the piezo motor is composed of a lead screw, a stator screwed with the lead screw, and at least two pieces of piezo elements arranged on an outer circumference portion of the stator,
    the lead screw is a screw bolt having a male thread,
    the stator is a nut having a female thread hole formed on an inner circumference, and
    the lead screw and the stator are screwed together in a state capable of screw rotation and applied with repeating screw rotation so that the male thread and the female thread are subjected to a sliding load, wherein the Vickers hardness of a first metal material constituting the male thread of the screw bolt is $H_1$, and the Vickers hardness of a second metal material constituting the female thread formed on the inner circumference of the female thread hole in the nut is $H_2$, and $|H_1-H_2|=300$ HV0.1 to 350 HV0.1.

2. The camera according to claim 1, wherein the Vickers hardness of said first metal material $H_1$ is in a range of 550 HV0.1 to 600 HV0.1.

3. The camera according to claim 1, wherein said first metal material is a martensite stainless steel with an alloy composition comprising:
  Nickel: 0.6 wt % or less,
  Chromium: 12.0 to 18.0 wt %;
  Carbon: 0.16 to 1.2 wt %;
  Silicon: 1.0 wt % or less;
  Manganese: 1.25 wt % or less;
  Phosphorous: 0.06 wt % or less; and
  Sulfur: 0.15 wt % or less.

4. The camera according to claim 1, wherein the Vickers hardness of said second metal material $H_2$ is in a range of 220 HV0.1 to 240 HV0.1.

5. The camera according to claim 1, wherein said second metal material is an austenite stainless steel with an alloy composition comprising:
  Nickel: 7.0 to 13.0 wt %;
  Chromium: 17.0 to 20.0 wt %;
  Carbon: 0.15 wt % or less;
  Silicon: 1.0 wt % or less;
  Manganese: 2.5 wt % or less;
  Phosphorous: 0.2 wt % or less; and
  Sulfur: 0.15 wt % or less.

6. The camera according to claim 1, wherein the threads formed on said screw bolt and nut have:
  a nominal diameter M of 1.1 mm or less;
  a pitch P of 0.2 mm or less;
  a radial length at a screwed portion of 0.05 mm or more;
  a width of a thread peak portion of 0.015 mm to 0.05 mm;
  a width of a thread groove portion of the screw bolt of 0.04 mm or less; and
  a width of a thread groove portion of the nut of 0.03 mm or less.

7. The camera according to claim 1, wherein the effective diameter tolerance zone grade of the threads formed on said screw bolt is 3 G and the effective diameter tolerance zone grade of the threads formed on the nut is 4 G.

\* \* \* \* \*